United States Patent
Gorbatov et al.

(10) Patent No.: US 10,121,232 B1
(45) Date of Patent: Nov. 6, 2018

(54) VISUAL QUALITY OF PHOTOGRAPHS WITH HANDWRITTEN CONTENT

(71) Applicant: Evernote Corporation, Redwood City, CA (US)

(72) Inventors: Boris Gorbatov, Sunnyvale, CA (US); Eugene Livshitz, San Mateo, CA (US); Alexander Pashintsev, Cupertino, CA (US); Ilia Buriak, Moscow (RU); Natalia Galaktionova, Moscow (RU)

(73) Assignee: EVERNOTE CORPORATION, Redwood City, CA (US)

( * ) Notice: Subject to any disclaimer, the term of this patent is extended or adjusted under 35 U.S.C. 154(b) by 132 days.

(21) Appl. No.: 15/384,956

(22) Filed: Dec. 20, 2016

Related U.S. Application Data

(60) Provisional application No. 62/387,248, filed on Dec. 23, 2015.

(51) Int. Cl.
*G06T 5/00* (2006.01)
*G01B 11/24* (2006.01)
(Continued)

(52) U.S. Cl.
CPC .............. *G06T 5/002* (2013.01); *G01B 11/02* (2013.01); *G01B 11/24* (2013.01); *G06K 9/4638* (2013.01);
(Continued)

(58) Field of Classification Search
CPC ...... G01B 11/02; G01B 11/24; G06K 9/4638; G06T 5/002; G06T 5/005; G06T 2207/20192
See application file for complete search history.

(56) References Cited

U.S. PATENT DOCUMENTS 5,142,589 A * 8/1992 Lougheed ............... G06K 9/44
382/102
5,410,611 A * 4/1995 Huttenlocher ........... G06K 9/32
382/177
(Continued)

OTHER PUBLICATIONS

Li et al. ("Validation of Image Defect Models for Optical Character Recognition," IEEE Trans. Pattern Anal. Mach. Intel. 18(2), Feb. 1996) (Year: 1996).*

*Primary Examiner* — Yubin Hung
(74) *Attorney, Agent, or Firm* — Morgan, Lewis & Bockius LLP

(57) ABSTRACT

Improving visual quality of a raster image includes detecting connectivity components, detecting defects in each of the connectivity components based on a characteristic line width thereof, detecting segments in each of the connectivity components, detecting joints based on geometry of the connectivity components, creating a structural graph based on the segments and joints, and correcting the raster image according to the structural graph and detected ones of the defects. The joints may correspond to linear joints, T-joints, or X-joints. Detecting types of joints may include determining a configuration of adjacent segments in a proximity of each of the joints. A characteristic line width may be determined by determining co-boundaries on opposite sides of each of the segments and determining average distances between the co-boundaries. The raster image may be a binary black-and-white image of a line drawing obtained from a photograph or a scan of a handwritten document.

26 Claims, 7 Drawing Sheets

System flow diagram

(51) Int. Cl.
*G01B 11/02* (2006.01)
*G06K 9/46* (2006.01)

(52) U.S. Cl.
CPC .... *G06T 5/005* (2013.01); *G06T 2207/20192* (2013.01)

(56) References Cited

U.S. PATENT DOCUMENTS

| | | | | |
|---|---|---|---|---|
| 5,553,224 | A * | 9/1996 | Saund | G06T 11/00 345/619 |
| 7,400,768 | B1 * | 7/2008 | Mayzlin | G06K 9/03 382/177 |
| 2002/0150297 | A1 * | 10/2002 | Gorbatov | G06F 3/04883 382/202 |
| 2005/0180653 | A1 * | 8/2005 | Prakash | G06K 9/44 382/264 |
| 2007/0160292 | A1 * | 7/2007 | Wu | G06K 9/00429 382/181 |
| 2008/0247674 | A1 * | 10/2008 | Walch | G06K 9/344 382/305 |
| 2010/0177191 | A1 * | 7/2010 | Stier | G01N 21/8806 348/92 |
| 2011/0175916 | A1 * | 7/2011 | Noris | G06K 9/00416 345/441 |
| 2014/0168478 | A1 * | 6/2014 | Baheti | G06K 9/2081 348/240.99 |

* cited by examiner

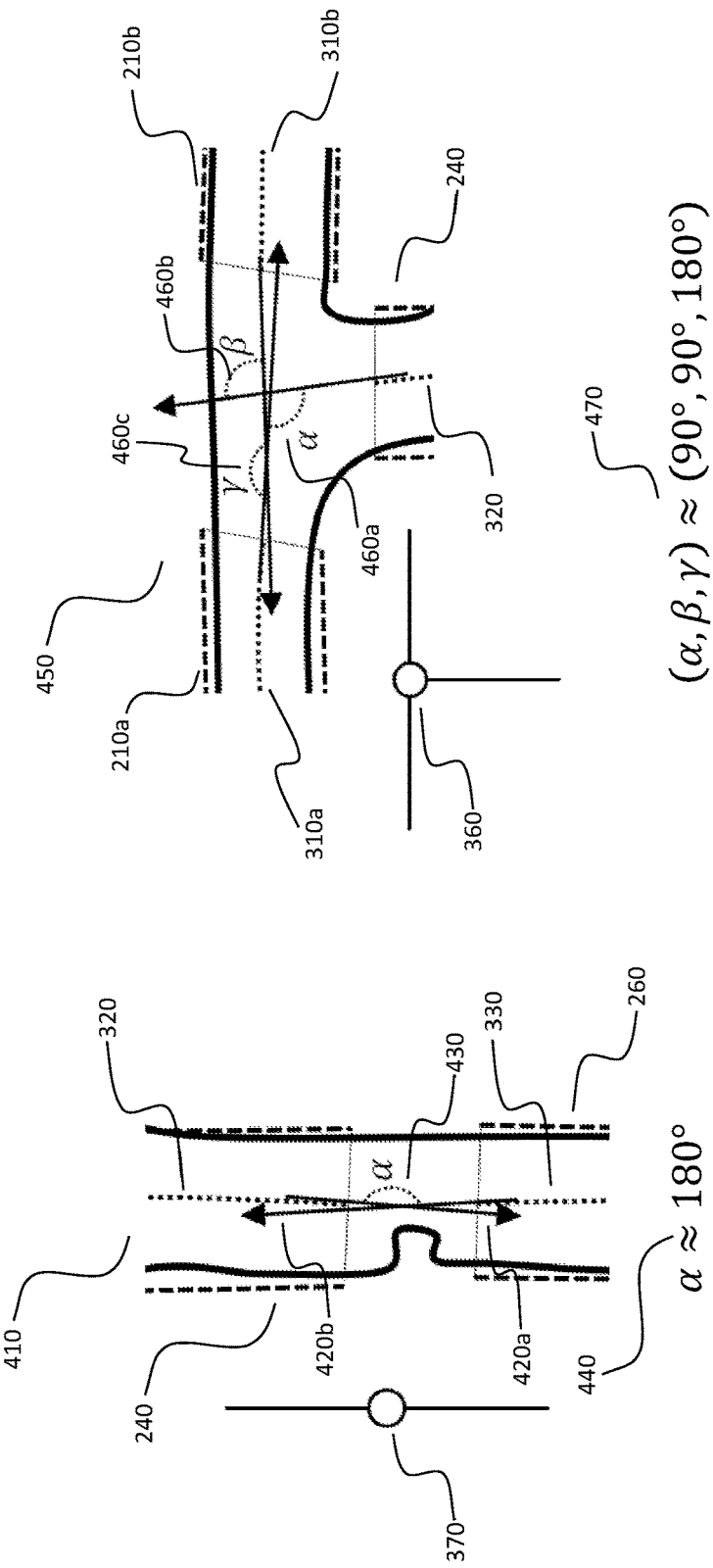

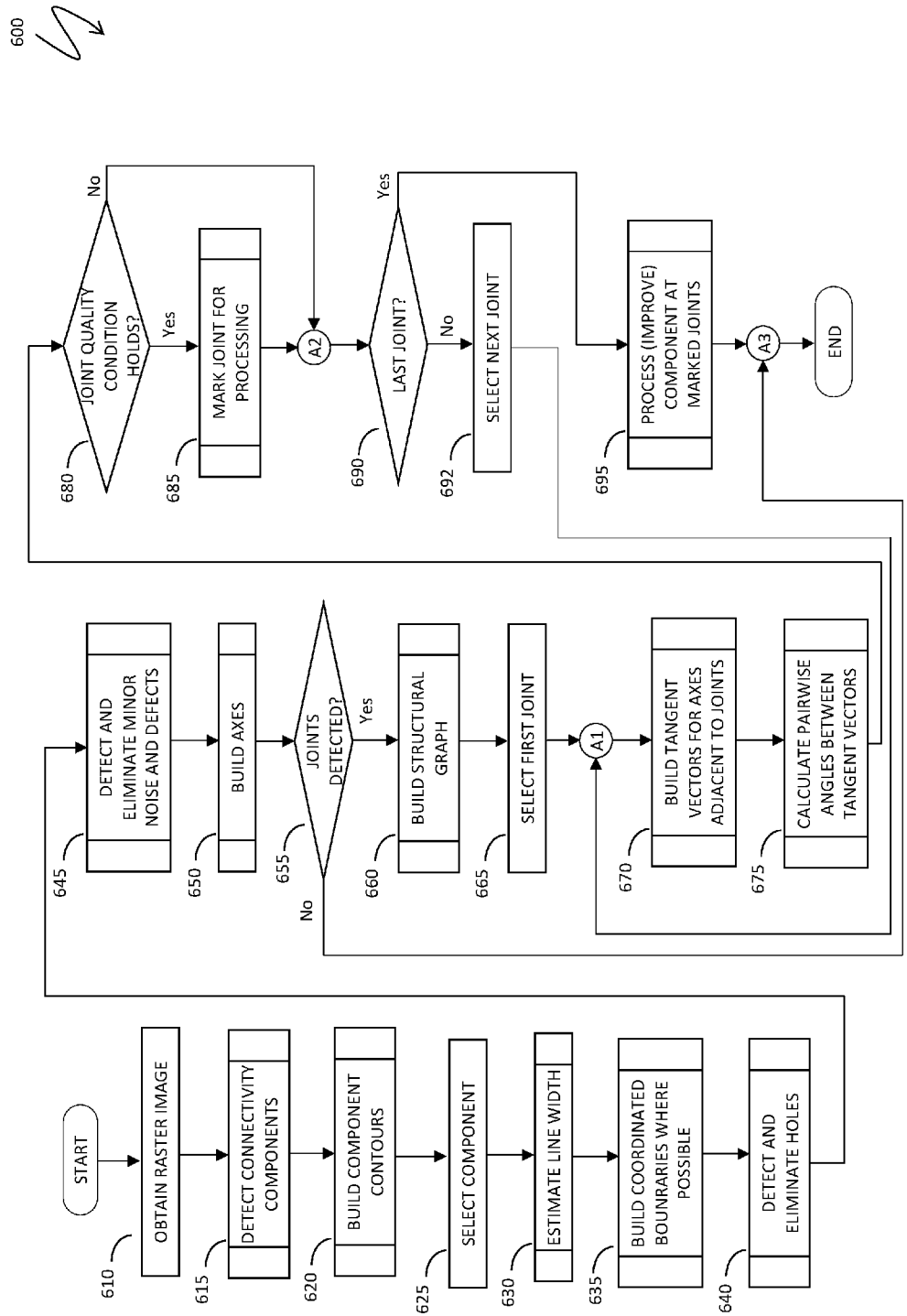
FIG. 6. System flow diagram

VISUAL QUALITY OF PHOTOGRAPHS WITH HANDWRITTEN CONTENT

CROSS-REFERENCE TO RELATED APPLICATIONS

This application claims priority to U.S. Prov. App. No. 62/387,248, filed Dec. 23, 2015, and entitled "IMPROVING VISUAL QUALITY OF PHOTOGRAPHS WITH HANDWRITTEN CONTENT," which is incorporated by reference herein.

TECHNICAL FIELD

This application is directed to the field of image processing, and more particularly to the field of improving visual quality of photographic images that include handwritten content.

BACKGROUND OF THE INVENTION

Mobile phones with digital cameras dominate the worldwide market of mobile devices. Market research data suggests that annual smartphone shipments will grow to 1.87 billion units by 2018, and over 80% of all mobile phones will be arriving to customers with embedded digital cameras. New shipments of camera-enabled smartphones will expand the already massive audience of nearly five billion mobile phone users and over seven billion mobile subscribers. Annual sales of phone cameras to mobile phone manufacturers for embedding into smartphones and feature phones are projected to exceed 1.5 billion units.

The volume of photographs taken with phone cameras is also growing rapidly. Images from smartphone cameras are ubiquitous on all social photo sharing sites. According to recent surveys by Pew Research and other analysts, photographing with phone cameras is the single most popular activity of smartphone owners and is utilized by more than 80% of users, exceeding the use of the next popular category of texting applications. Additionally, according to recent studies, about 27% of all photographs taken with any equipment have been made with smartphone cameras.

Hundreds of millions smartphone users are increasingly incorporating smartphone cameras into their information capturing and processing lifestyles and workflows at work and at home. Digitizing and capturing paper based information is becoming ubiquitous. Thus, a recent survey of smartphone usage by millennials has revealed that 68% of survey respondents have been introduced to mobile information capturing via mobile check deposits, while 83% share an opinion that mobile capture of paper documents will be part of all mobile transactions within the next few years. Business oriented users are capturing with their mobile cameras more and more meeting materials, notes and brainstorms from whiteboards, Moleskine and other paper notebooks, and other handwritten media. For example, a 2015 study of corporate whiteboard users has discovered that 84% of survey participants have a need to store whiteboard content "from time to time"; accordingly, 72% of participants had taken a photograph of a whiteboard at least once, while 29% stored at least 10 images of whiteboards on their camera enabled smartphones or tablets or in associated cloud services.

The arrival of unified multi-platform content management systems, such as the Evernote service and software developed by Evernote Corporation of Redwood City, Calif., is aimed at capturing, storing, displaying and modifying all types and formats of information across a variety of user devices. The Evernote service and software and similar systems have facilitated and stimulated taking photographs or mobile scans of typed and handwritten text, documents, forms, checks, charts, drawings and other types and formats of real-life content with smartphone cameras; a dedicated Scannable application, also developed by Evernote Corporation, facilitates capturing of documents, whiteboards, handwritten notes, etc.

Content entered by users with smartphones, other cameras or scanners is initially stored in a content management system as a raster image. Visual appearance of the content plays a significant role in user satisfaction and productivity. Notwithstanding significant progress in hardware, including camera resolution, in targeting and auto-focusing technologies, in image stabilization and other quality improvements for capturing technologies, a significant portion of image content photographed by users suffers from a variety of defects. This may be especially damaging for photographs of line art produced via conventional handwriting and drawing that utilizes ball pens, pencils, whiteboard markers and other writing tools. Various artefacts such as uneven brightness and gaps in continuous handwritten lines due to varying pressure and shortcomings of writing tools, jitter and photo capturing noise, blurry line intersections, letter and shape connections and other flaws unfavorably affect usability of handwritten media captured from paper as photographed images in a variety of formats.

Accordingly, it is useful to develop methods and systems for improving visual quality of photographs with handwritten content.

SUMMARY OF THE INVENTION

According to the system described herein, improving visual quality of a raster image includes detecting connectivity components, detecting defects in each of the connectivity components based on a characteristic line width thereof, detecting segments in each of the connectivity components, detecting joints based on geometry of the connectivity components, creating a structural graph based on the segments and joints, and correcting the raster image according to the structural graph and detected ones of the defects. The joints may correspond to linear joints, T-joints, or X-joints. Detecting types of joints may include determining a configuration of adjacent segments in a proximity of each of the joints. A linear joint may be detected by determining that an angle between axes of two segments in a proximity of a joint is approximately 180 degrees. The two segments may be joined to correct the linear joint. A T-joint may be detected by determining that an angle between axes of a first segment and a second segment in a proximity of a joint is approximately 180 degrees, an angle between the axis of the first segment and an axis of a third segment in a proximity of a joint is approximately 90 degrees and an angle between axes of the second segment and the third segment in a proximity of a joint is approximately 90 degrees. Uneven angles between the first, second, and third segments may be sharpened to correct the T-joint. An X-joint may be detected by determining that an angle between axes of a first segment and a second segment in a proximity of a joint is approximately 90 degrees, an angle between the axis of the second segment and an axis of a third segment in a proximity of a joint is approximately 90 degrees, an angle between the axis of the third segment and an axis of a fourth segment in a proximity of a joint is approximately 90 degrees, and an angle between axes of the fourth segment and the first segment in a proximity of a joint is approximately 90 degrees. Uneven angles between the first, second, third, and fourth segments may be sharpened to correct the X-joint. The defects may include holes and minor deviations from the characteristic line width. The defects may be a result of artifact noise. The characteristic line width may be determined by determining co-boundaries on opposite sides of each of the segments and determining average distances between the co-boundaries. The raster image may be a binary black-and-white image of a line drawing obtained from a photograph or a scan of a handwritten document.

According further to the system described herein, a non-transitory computer readable medium contains software that improves visual quality of a raster image. The software includes executable code that detects connectivity components, executable code that detects defects in each of the connectivity components based on a characteristic line width thereof, executable code that detects segments in each of the connectivity components, executable code that detects joints based on geometry of the connectivity components, executable code that creates a structural graph based on the segments and joints, and executable code that corrects the raster image according to the structural graph and detected ones of the defects. The joints may correspond to linear joints, T-joints, or X-joints. Detecting types of joints may include determining a configuration of adjacent segments in a proximity of each of the joints. A linear joint may be detected by determining that an angle between axes of two segments in a proximity of a joint is approximately 180 degrees. The two segments may be joined to correct the linear joint. A T-joint may be detected by determining that an angle between axes of a first segment and a second segment in a proximity of a joint is approximately 180 degrees, an angle between the axis of the first segment and an axis of a third segment in a proximity of a joint is approximately 90 degrees and an angle between axes of the second segment and the third segment in a proximity of a joint is approximately 90 degrees. Uneven angles between the first, second, and third segments may be sharpened to correct the T-joint. An X-joint may be detected by determining that an angle between axes of a first segment and a second segment in a proximity of a joint is approximately 90 degrees, an angle between the axis of the second segment and an axis of a third segment in a proximity of a joint is approximately 90 degrees, an angle between the axis of the third segment and an axis of a fourth segment in a proximity of a joint is approximately 90 degrees, and an angle between axes of the fourth segment and the first segment in a proximity of a joint is approximately 90 degrees. Uneven angles between the first, second, third, and fourth segments may be sharpened to correct the X-joint. The defects may include holes and minor deviations from the characteristic line width. The defects may be a result of artifact noise. The characteristic line width may be determined by determining co-boundaries on opposite sides of each of the segments and determining average distances between the co-boundaries. The raster image may be a binary black-and-white image of a line drawing obtained from a photograph or a scan of a handwritten document.

The proposed system splits a raster image of handwritten content into connectivity components, detects an initial closed boundary (contour) of each component, detects pieces of coordinated boundaries (co-boundaries) within contours that are representative of linear non-intersecting pieces of writing and uses co-boundaries to statistically estimate a characteristic line width. Subsequently, the system re-processes each component in several steps by building axial lines (axes) for each piece of co-boundaries, comparing widths of co-boundaries with the average line width, using such comparisons to eliminate holes in handwritten lines and to fix minor deviations caused by noise, detecting unresolved deviations and pieces where co-boundaries don't exist and marking the unresolved deviations as joints, or vertices of a structure graph, categorizing joints into linear ($2^{nd}$ degree vertex), T-joints ($3^{rd}$ degree vertex) and X-joints ($4^{th}$ degree vertex) and assessing quality of each joint by comparing angles between pairs of tangent vectors to axes of each piece of co-boundaries adjacent to a joint. Pieces of co-boundaries and joints that pass the quality test are re-processed at the final step to produce a visually pleasing shape of the component.

The proposed system improves visual quality of line drawings through a sequence of steps explained below.

1. An input to the system is a binary black-and-white image of a line drawing obtained from a photograph, a scan or another capture of a handwritten document entered on paper, whiteboard or other surface suitable for drawing.
2. The system detects connectivity components of the drawing (hereinafter, "components"), such as letter elements, letters, words, shapes, doodles, etc.
3. Most components include linear non-intersected segments that may be separated by joints of multiple segments. The proposed system is capable of resolving three types of joints:
   a. Linear joints where a linear segment may be undetectable at a full length of the segment because of defects caused by various reasons, such as a blot, a hole, a jitter, a glare, etc.
   b. T-joints where two linear segments connect without a visibly protruding intersection.
   c. X-joints where two linear segments intersect so that two parts of each segment are visible on both sides of the joint.
4. Detection of linear segments is based on known algorithms of building coordinated boundaries (co-boundaries) on opposite sides of a segment. After a sufficient number of co-boundaries are built for various pieces of components, the system calculates distances between co-boundaries, i.e. a width of each piece. Subsequently, the system uses the set of widths to statistically estimate a characteristic line width. In most cases of ordinary drawings, say, with a ball pen or a pencil, the system would produce a single characteristic line width. If, however, there are several disparate and reliable values for characteristic line widths (for example, if an original line drawing has been produced with different tools or with a tool allowing various line widths), the system may reject a drawing or proceed with operations repeated for each of the characteristic line widths trying to separate segments with different widths. The following text describes a scenario with one characteristic line width.
5. Now that the line width of the writing tool is known, the system attempts to reproduce an ideal drawing for each component and to fix defects present in drawings. The system uses the co-boundaries to detect uncharacteristically thin and short pieces of linear segments, which may indicate artefacts caused by holes in the line where black ink is replaced with a white background. Such defects may be isolated and holes may be eliminated.
6. The system builds axes (skeletons, middle lines) for pieces with detected co-boundaries. Minor deviations from the characteristic line width along pieces caused by noise, jitter and other defects may be corrected in place; axes may be upgraded after such corrections.

7. The previous steps may leave a component partially corrected but with undecided corrections associated with (i) strong deviations from the characteristic line width on linear segments and (ii) with joints where multiple segments intersect with each other. To address these uncertainties, a structural graph of a component is built; edges of the graph correspond to pieces with previously built co-boundaries and vertices are categorized into linear joints (significant deviations from the characteristic line width without intersections of several pieces), T-joints, and X-joints. Other, more complex intersections may be ignored.
8. For each vertex of the structure graph, tangent vectors at the end of axes adjacent to the joint may be built and pairwise angles between the tangent vectors may be calculated.
9. Joint quality condition for each type of joint is assessed as follows:
    a. Linear 2nd degree joint—$\alpha \approx 180°$
    b. T-joint—$(\alpha, \beta, \gamma) \approx (90°, 90°, 180°)$ (tangent vectors that form the angle $\gamma$ correspond to the shelf of the T).
    c. X-joint—$(\alpha, \beta, \gamma) \approx (90°, 180°, 180°)$ (tangent vectors that form the angles $\beta, \gamma$ correspond to pairs of opposite axes adjacent to the joint).
10. Linear joints satisfying the quality condition are dropped and visual appearance of the component is improved as follows: two adjacent axes are merged and the whole segment formed by two combined pieces is redrawn with a constant characteristic pen width.
11. Visual appearance of T-joints satisfying the quality condition is improved by replacing arbitrary (and typically different) conjugation angles between the stick and the left/right part of the shelf of the T-joint with sharpened angles. X-joint is improved analogously.

BRIEF DESCRIPTION OF THE DRAWINGS

Embodiments of the system described herein will now be explained in more detail in accordance with the figures of the drawings, which are briefly described as follows.

FIGS. 4A-4C are schematic illustrations of quality assessment methods for a linear joint, a T-joint and an X-joint, according to embodiments of the system described herein.

FIG. 6 is a system flow diagram illustrating processing performed in connection with improvements of line quality, according to embodiments of the system described herein.

DETAILED DESCRIPTION OF VARIOUS EMBODIMENTS

The system described herein provides a mechanism for improving visual quality of raster images of handwritten content by sequentially eliminating line defects based on building coordinated boundaries on contours of connectivity components, detecting defects and joints and analyzing joint quality.

Figure 1:
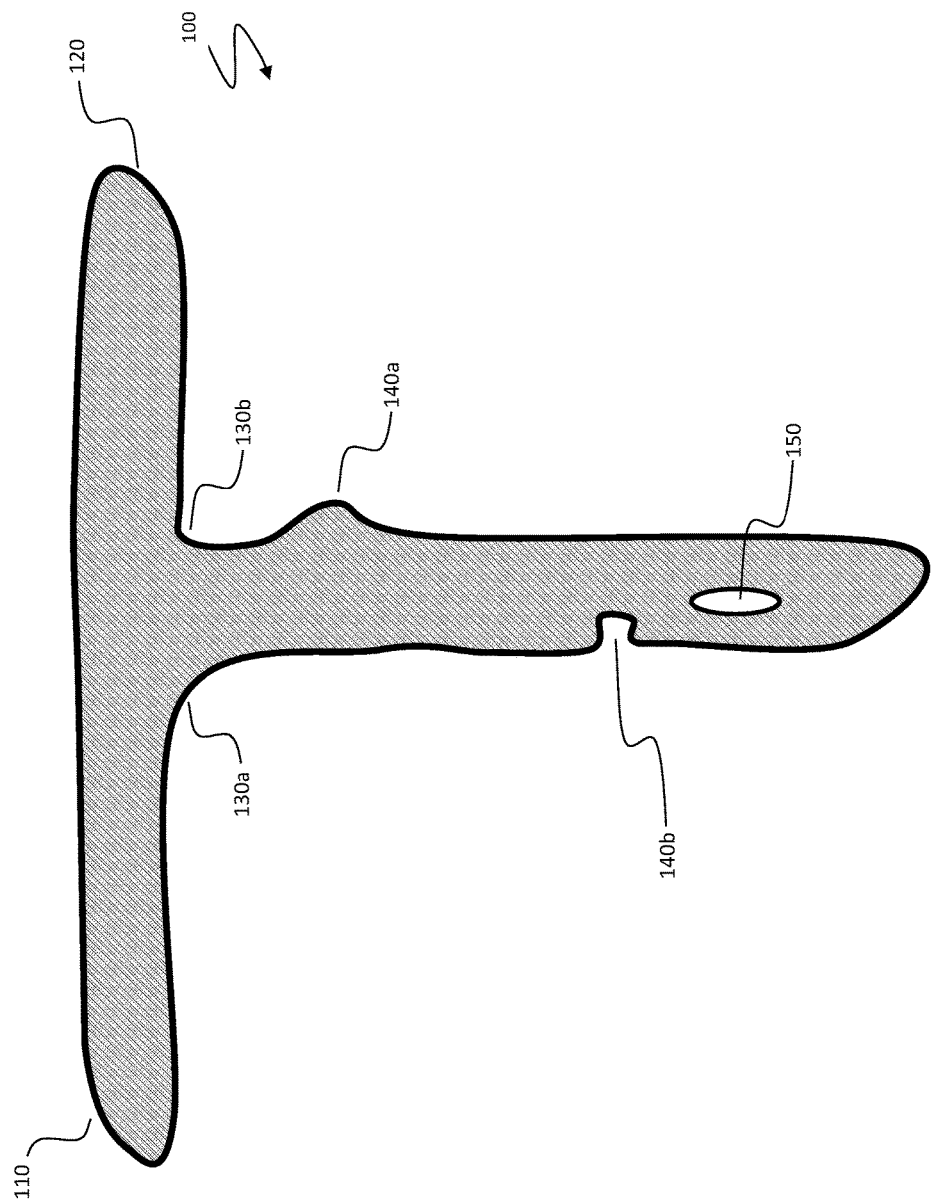
FIG. 1 is a schematic illustration of a connected component on a raster image of handwritten content, according to embodiments of the system described herein.

FIG. 1 is a schematic illustration 100 of a connected component on a raster image of handwritten content. A connectivity component 110 on the raster image has a contour 120, as explained elsewhere herein. The contour 120 has two uneven angles 130a, 130b of the shelf of a T-shape with a stick portion. The uneven angles 130a, 130b correspond to an image defect. Other defects of the image include noise-related deviations 140a, 140b of the shape of the contour and a hole 150 that may result from shortcomings in a writing instrument, paper or other writing surface, lighting conditions at the capturing time, etc.

Figure 2:
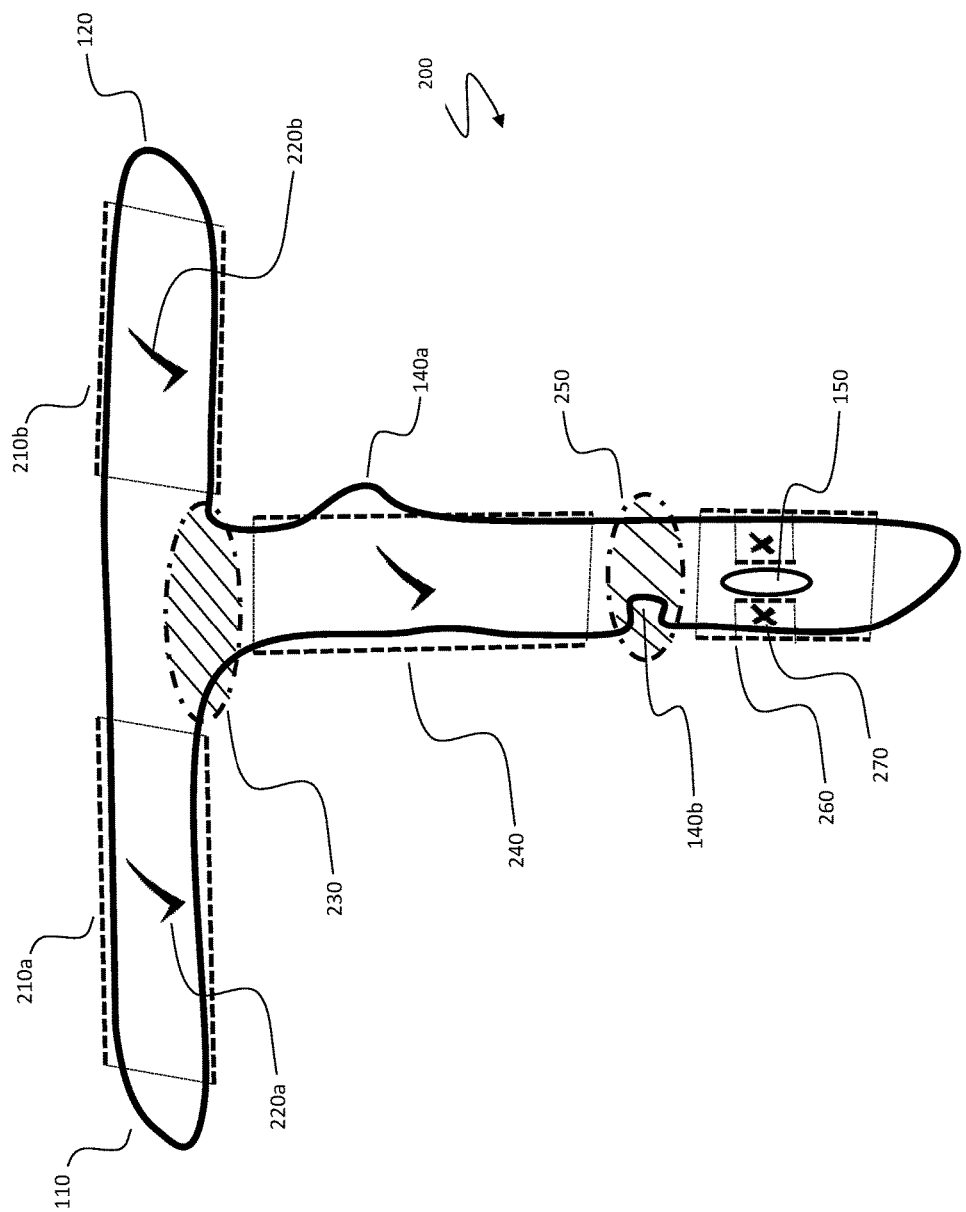
FIG. 2 is a schematic illustration of building pieces of co-boundaries, according to embodiments of the system described herein.

FIG. 2 is a schematic illustration 200 of building pieces of co-boundaries. The component 110 with the contour 120 is processed by an algorithm that detects coordinated boundaries based on known methods. The illustration of FIG. 2 assumes that a characteristic line width has been already estimated and remains constant for the component 110, as explained elsewhere herein (see, in particular, steps 4, 5 in the description above). There are two pieces 210a, 210b of the component 110 that are immediately identified as quality candidates, as indicated by acceptance checkmarks 220a, 220b. In addition, a segment 240 may be accepted too, after the defect 140a on the contour 120 is assessed as insignificant compared with a long and consistent spread of the segment 240 around the defect 140a.

A portion 230 of the component 110 between the three identified segments 210a, 210b, 240 does not have coordinated boundaries and may be marked as a candidate for joint (a T-joint). Below the segment 240 is the defect 140b, which is a cavity that is too deep to dismiss, unlike the defect 140a, which is a bump. Therefore, a vicinity 250 of the defect 140b may be marked as another candidate for a joint (a linear $2^{nd}$ degree joint).

A segment 260 near an end of the vertical stick of the component 110 does not immediately qualify as a piece with coordinated boundaries, because of the hole 150, which creates sub-segments with coordinated boundaries that are too thin and fall below the line width criteria, as indicated by a rejection sign 270.

Figure 3:
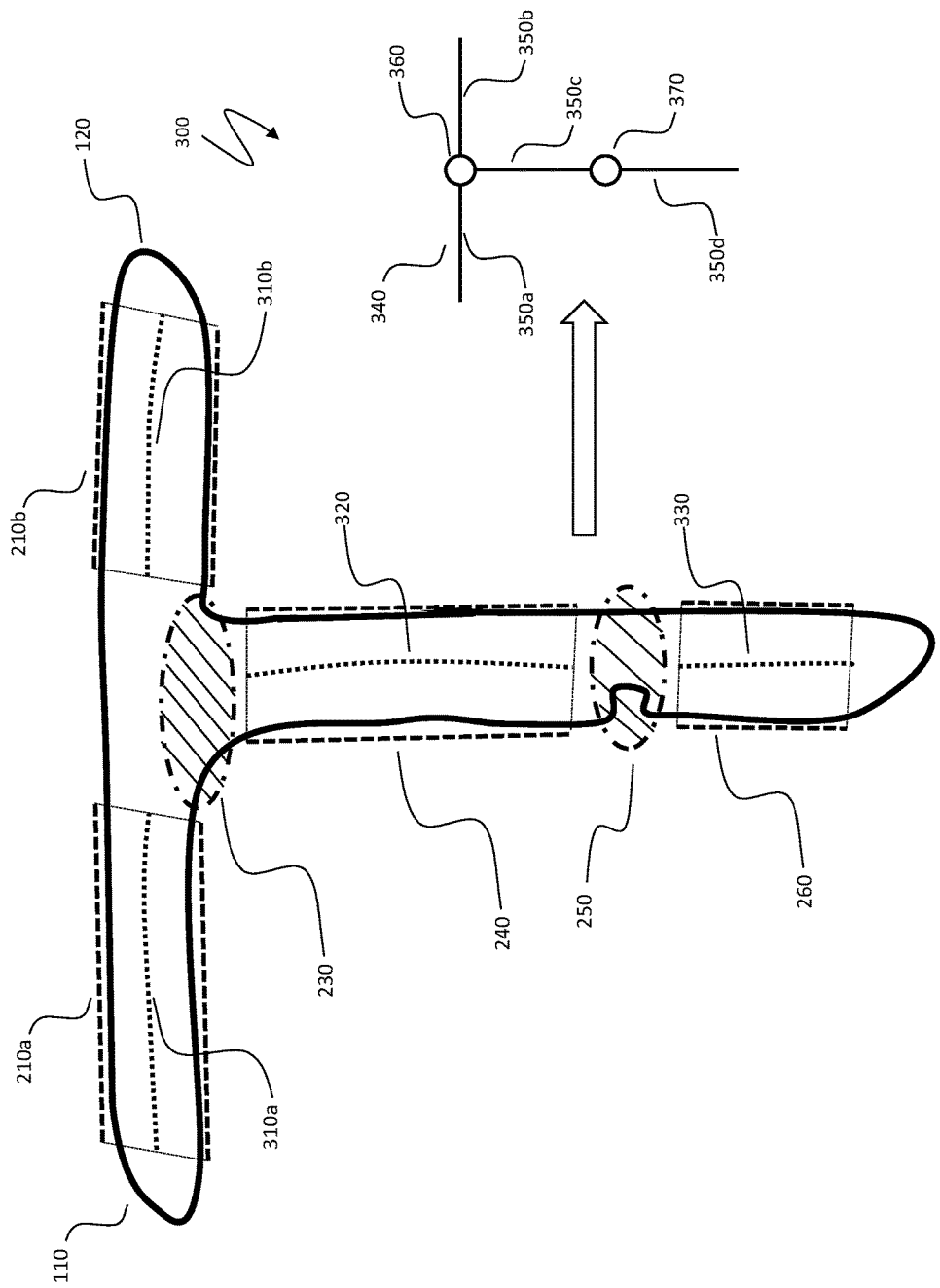
FIG. 3 is a schematic illustration of elimination of holes and minor deviations and of building a structure graph, according to embodiments of the system described herein.

FIG. 3 is a schematic illustration 300 of elimination of holes and minor deviations and of building a structure graph. The component 110 of an image with the contour 120 is processed segment by segment and joint by joint. At the first step of processing, the system eliminates the defect in the segment 240 (not shown in FIG. 3, see noise-driven bump 140a on the right side of the segment 240 in FIGS. 1, 2). Next, the system eliminates the hole in the section 260 (not shown in FIG. 3, see item 150 in FIGS. 1, 2). It should be noted that, in some cases, holes may not be automatically eliminated from components; eliminating a particular hole may depend on the size of a hole relative to line width; in case of FIG. 3, the width of hole is smaller than ⅓ of the line width, so the hole is eliminated, which transforms the section 260 of the component 110 into a segment with coordinated boundaries.

Next, the system builds axes for each segment; the axes represent edges of the structure graph and are subsequently used in assessing joint quality, as explained elsewhere herein. In FIG. 3, axial lines 310a, 310b, 320, 330 correspond to segments 210a, 210b, 240, 260, respectively, while joints are represented by two areas 230, 250 of the component. Accordingly, the structure graph 340 has four edges 350a, 350b, 350c, 350d corresponding to the axes 310a, 310b, 320, 330 and two vertices 360, 370 corresponding to the joints 230, 250.

Figure 4C:
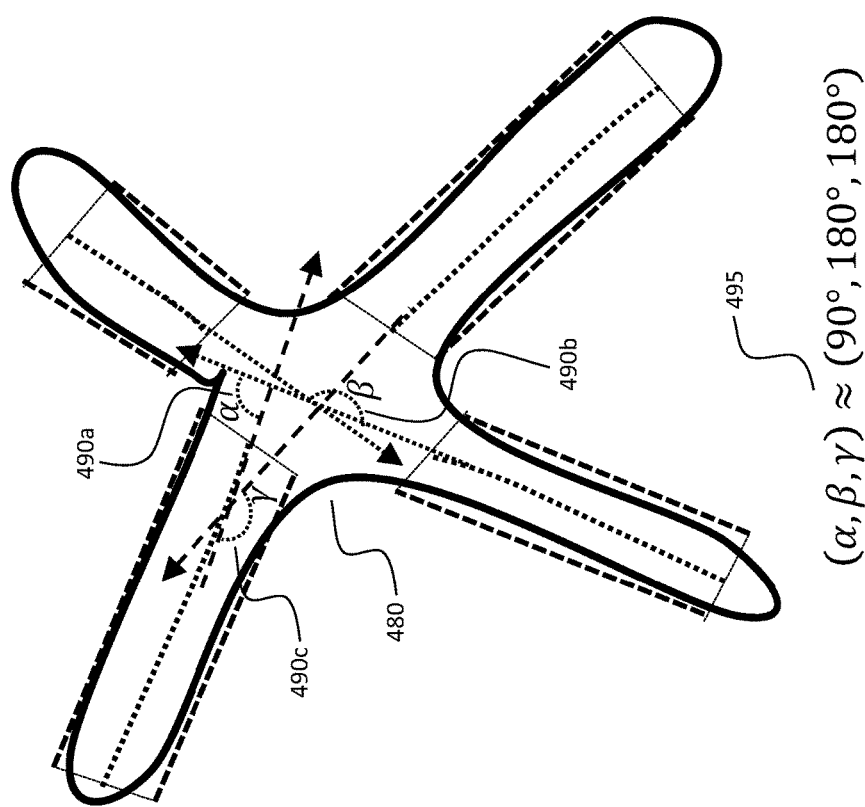

FIGS. 4A-4C are schematic illustrations of quality assessment methods for a linear joint, a T-joint and an X-joint. FIG. 4A shows a $2^{nd}$ order linear joint 370 on the structure graph (see FIG. 3 for details) and a corresponding portion 410 of the image component that includes parts of segments 240, 260 and the corresponding axes 320, 330. An area between the segments 240, 260 represents the joint 370 and corresponds to the area 250 in FIGS. 2, 3 (not marked in FIG. 4A). The system builds tangent vectors 420a, 420b at ends of axes and checks the angle 230 between the tangent vectors 420a, 420b; a condition 440 of a quality joint is an approximate collinearity of the two tangent vectors 420a, 420b, i.e. a degree of closeness of the angle 230 ($\alpha$) to 180 degrees. If the condition 440 is satisfied, the system may view the joint as a defect and merge the two segments 240, 260 separated by the joint into one segment, thus eliminating the cavity (see item 140b in FIG. 2).

FIG. 4B illustrates a vertex 360 on the structure graph of FIG. 3 and a corresponding portion 450 of the component 110 with parts of the adjacent segments 210a, 210b, 240 and the corresponding axes 310a, 310b, 320. Tangent vectors are built at ends of the axes and angles between pairs of tangent vectors, namely, an angle 460a ($\alpha$), an angle 460b ($\beta$) and an angle 460c ($\gamma$) are measured. If a condition 470 of joint quality is satisfied, i.e. two of the segments are nearly collinear and the third segment is nearly orthogonal to each of the two segments, then the T-joint is considered regular, which signals to the system that the two angles on the contour between the shelf and the stick of the T-shape may be sharpened.

Figure 5:
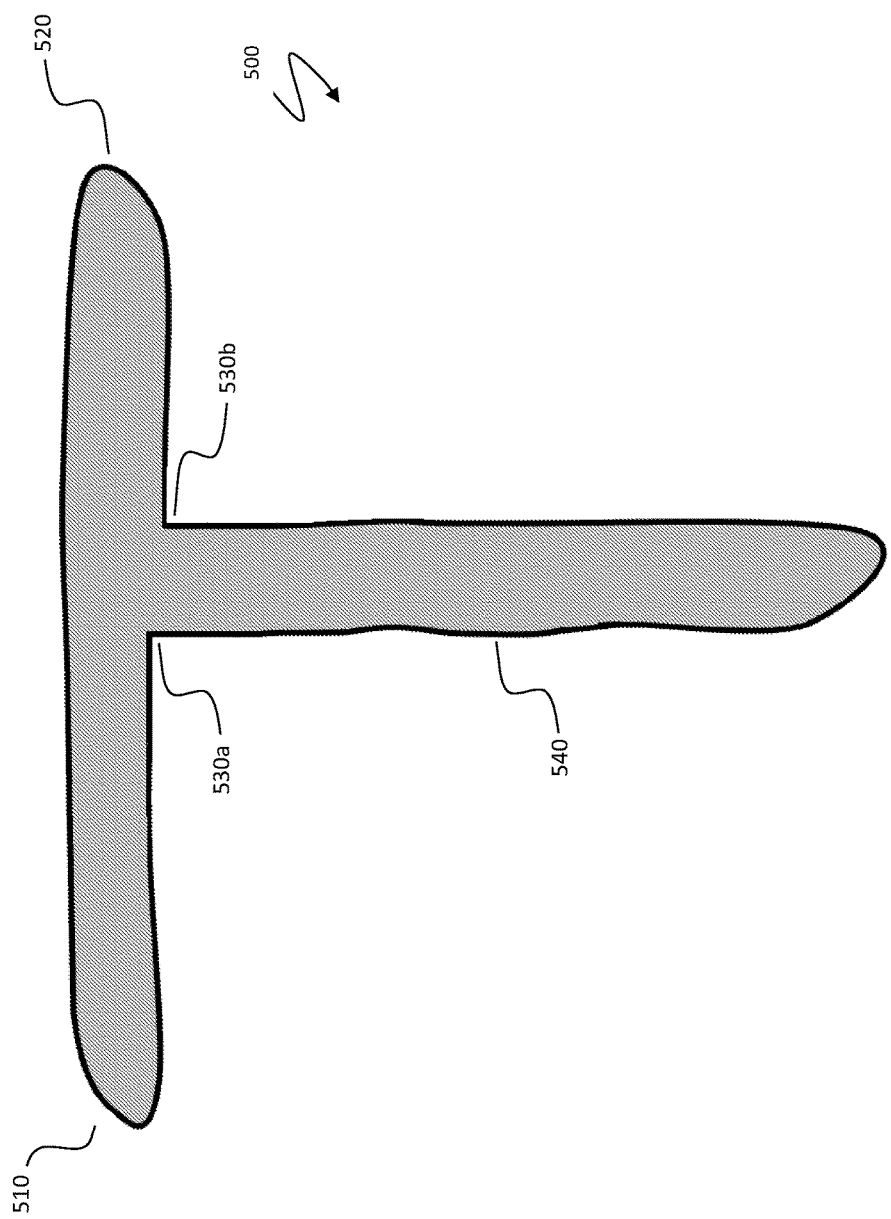
FIG. 5 is a schematic illustration of an improved re-drawn component, according to embodiments of the system described herein.

FIG. 4C a X-joint 480 (not shown in FIGS. 1-3) where a quality condition 495 can be checked by comparing three angles 490a, 490b, 490c between certain pairs of tangent vectors built at the ends of axes of the four segments adjacent to the X-joint. Analogously to FIG. 4B, if the condition 495 is satisfied and the axes form a cross-like configuration, then the system may sharpen round angles between adjacent segments on the contour of the component FIG. 5 is a schematic illustration 500 of an improved re-drawn version of the component 110. An improved component 510 with a contour 520 takes advantage of the previous steps of component processing, explained elsewhere herein. The improved component 510 sharpens two angles 530a, 530b between the shelf and the stick of the T-shape and eliminates noise-related and other defects on a stick portion 540 of the T-shape. Sharpening the angles includes replacing the gradual curvature between the two portions with relatively straight lines that intersect orthogonally.

Referring to FIG. 6, a flow diagram 600 schematically illustrates processing performed in connection with improving visual quality of a component on a raster image. In an embodiment herein, processing illustrated by the flow diagram 600 may be provided using a mobile device, such as a mobile phone, that may or may not have been used to capturing an image on which improvements of visual quality are performed. Other processing platforms may be used, such as a laptop or desktop computer. Processing starts at a step 610, where a raster image is obtained. After the step 610, processing proceeds to a step 615, where the system detects connectivity components on the image. After the step 615, processing proceeds to a step 620, where the system builds contours for each connectivity component. After the step 620, processing proceeds to a step 625, where a component is selected. The remainder of the flow diagram 600 describes the processing in connection with a single component and a corresponding contour.

After the step 625, processing proceeds to a step 630, where the system estimates line width, as explained elsewhere herein. After the step 630, processing proceeds to a step 635, where the system builds coordinated boundaries along the component where possible. After the step 635, processing proceeds to a step 640, where the system detects, analyzes and eliminates holes in the component, as explained elsewhere herein (see in particular FIGS. 1-3 and the accompanying text). After the step 640, processing proceeds to a step 645, where the system eliminates minor noise-related defects and other defects (see FIGS. 1-3 with explanation in the text).

After the step 645, processing proceeds to a step 650, where the system build axes for each segment with coordinated boundaries found for the component. After the step 650, processing proceeds to a test step 655, where it is determined whether joints outside and/or between segments have been detected, as explained elsewhere herein. If not, processing is complete; otherwise, proceeds to a step 660, where the system builds structural graph, as explained elsewhere herein (for example, in FIG. 3 and the accompanying text). After the step 660, processing proceeds to a step 665, where the system selects the first joint. After the step 665, processing proceeds to a step 670, where the system builds tangent vectors at the ends of axes that are adjacent to joints, as explained elsewhere herein, including FIGS. 4A-4C and the accompanying text.

After the step 670, processing proceeds to a step 675, where certain pairwise angles between tangent vectors are calculated (depicted in FIGS. 4A-4C and explained in the accompanying text). After the step 675, processing proceeds to a test step 680, where it is determined whether joint quality conditions hold, as explained elsewhere herein, in particular in FIGS. 4A-4C and in the accompanying text. If so, processing proceeds to a step 685, where the joint is marked for processing. After the step 685, processing proceeds to a test step 690 (which may be independently reached from the test step 680 if the joint quality condition does not hold), where it is determined whether the current joint is the last one. If so, processing proceeds to a step 695 where the component is processed and potentially improved at all previously marked joints. After the step 695, processing is complete. If it is determined at the text step 690 that the current joint is not the last joint, processing proceeds to a step 692, where a next joint is selected. After the step 692, processing proceeds back to a test step 670.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Capturing of raster images may be done using smartphones, tablets and other mobile devices with embedded cameras, as well as conventional cameras, scanners and other hardware, such as desktop or laptop computers having camera functionality.

Software implementations of the system described herein may include executable code that is stored in a computer readable medium and executed by one or more processors, including one or more processors of a desktop computer.

The desktop computer may receive input from a capturing device that may be connected to, part of, or otherwise in communication with the desktop computer. The desktop computer may include software that is pre-loaded with the device, installed from an app store, installed from media such as a CD, DVD, etc., and/or downloaded from a Web site. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of improving visual quality of a raster image, comprising:
   detecting connectivity components;
   detecting defects in each of the connectivity components;
   detecting segments in each of the connectivity components;
   detecting joints based on geometry of the connectivity components;
   creating a structural graph based on the segments and joints; and
   correcting the raster image according to the structural graph and detected ones of the defects.

2. A method, according to claim 1, wherein the joints correspond to one of: linear joints, T-joints, and X-joints.

3. A method, according to claim 2, wherein detecting types of joints includes determining a configuration of adjacent segments in a proximity of each of the joints.

4. A method, according to claim 2, wherein a linear joint is detected by determining that an angle between axes of two segments in a proximity of a joint is approximately 180 degrees.

5. A method, according to claim 4, wherein the two segments are joined to correct the linear joint.

6. A method, according to claim 2, wherein a T-joint is detected by determining that an angle between axes of a first segment and a second segment in a proximity of a joint is approximately 180 degrees, an angle between the axis of the first segment and an axis of a third segment in a proximity of a joint is approximately 90 degrees and an angle between axes of the second segment and the third segment in a proximity of a joint is approximately 90 degrees.

7. A method, according to claim 6, wherein uneven angles between the first, second, and third segments are sharpened to correct the T-joint.

8. A method, according to claim 2, wherein an X-joint is detected by determining that an angle between axes of a first segment and a second segment in a proximity of a joint is approximately 90 degrees, an angle between the axis of the second segment and an axis of a third segment in a proximity of a joint is approximately 90 degrees, an angle between the axis of the third segment and an axis of a fourth segment in a proximity of a joint is approximately 90 degrees, and an angle between axes of the fourth segment and the first segment in a proximity of a joint is approximately 90 degrees.

9. A method, according to claim 8, wherein uneven angles between the first, second, third, and fourth segments are sharpened to correct the X-joint.

10. A method, according to claim 1, wherein the defects include holes and minor deviations from the characteristic line width.

11. A method, according to claim 10, wherein the defects are a result of artifact noise.

12. A method, according to claim 1, wherein the characteristic line width is determined by determining co-boundaries on opposite sides of each of the segments and determining average distances between the co-boundaries.

13. A method, according to claim 1, wherein the raster image is a binary black-and-white image of a line drawing obtained from one of: a photograph or a scan of a handwritten document.

14. A non-transitory computer readable medium containing software that improves visual quality of a raster image, the software comprising:
   executable code that detects connectivity components;
   executable code that detects defects in each of the connectivity components;
   executable code that detects segments in each of the connectivity components;
   executable code that detects joints based on geometry of the connectivity components;
   executable code that creates a structural graph based on the segments and joints; and
   executable code that corrects the raster image according to the structural graph and detected ones of the defects.

15. A non-transitory computer-readable medium, according to claim 14, wherein the joints correspond to one of: linear joints, T-joints, and X-joints.

16. A non-transitory computer-readable medium, according to claim 15, wherein detecting types of joints includes determining a configuration of adjacent segments in a proximity of each of the joints.

17. A non-transitory computer-readable medium, according to claim 15, wherein a linear joint is detected by determining that an angle between axes of two segments in a proximity of a joint is approximately 180 degrees.

18. A non-transitory computer-readable medium, according to claim 17, wherein the two segments are joined to correct the linear joint.

19. A non-transitory computer-readable medium, according to claim 15, wherein a T-joint is detected by determining that an angle between axes of a first segment and a second segment in a proximity of a joint is approximately 180 degrees, an angle between the axis of the first segment and an axis of a third segment in a proximity of a joint is approximately 90 degrees and an angle between axes of the second segment and the third segment in a proximity of a joint is approximately 90 degrees.

20. A non-transitory computer-readable medium, according to claim 19, wherein uneven angles between the first, second, and third segments are sharpened to correct the T-joint.

21. A non-transitory computer-readable medium, according to claim 15, wherein an X-joint is detected by determining that an angle between axes of a first segment and a second segment in a proximity of a joint is approximately 90 degrees, an angle between the axis of the second segment and an axis of a third segment in a proximity of a joint is approximately 90 degrees, an angle between the axis of the third segment and an axis of a fourth segment in a proximity of a joint is approximately 90 degrees, and an angle between axes of the fourth segment and the first segment in a proximity of a joint is approximately 90 degrees.

22. A non-transitory computer-readable medium, according to claim 21, wherein uneven angles between the first, second, third, and fourth segments are sharpened to correct the X-joint.

23. A non-transitory computer-readable medium, according to claim 14, wherein the defects include holes and minor deviations from the characteristic line width.

24. A non-transitory computer-readable medium, according to claim 23, wherein the defects are a result of artifact noise.

25. A non-transitory computer-readable medium, according to claim 14, wherein the characteristic line width is determined by determining co-boundaries on opposite sides of each of the segments and determining average distances between the co-boundaries.

26. A non-transitory computer-readable medium, according to claim 14, wherein the raster image is a binary black-and-white image of a line drawing obtained from one of: a photograph or a scan of a handwritten document.

* * * * *